(12) United States Patent
Muir et al.

(10) Patent No.: US 9,246,804 B1
(45) Date of Patent: Jan. 26, 2016

(54) NETWORK ROUTING (71) Applicant: Hewlett-Packard Development Company, L.P., Houston, TX (US)

(72) Inventors: Vincent M. Muir, San Jose, CA (US); Eric Hagedorn, Chino Hills, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 350 days.

(21) Appl. No.: 13/691,120

(22) Filed: Nov. 30, 2012

(51) Int. Cl.
*H04W 4/00* (2009.01)
*H04L 12/741* (2013.01)

(52) U.S. Cl.
CPC ...................................... *H04L 45/74* (2013.01)

(58) Field of Classification Search
None
See application file for complete search history.

(56) References Cited

U.S. PATENT DOCUMENTS

| 7,415,028 | B1* | 8/2008 | Allam ...................... 370/395.54 |
| 7,742,429 | B1* | 6/2010 | Huang et al. .................. 370/254 |
| 7,769,886 | B2 | 8/2010 | Naseh et al. |
| 8,054,840 | B2 | 11/2011 | Booth et al. |
| 2006/0039385 | A1* | 2/2006 | Bare et al. ...................... 370/400 |
| 2007/0165532 | A1* | 7/2007 | Retana et al. .................. 370/241 |
| 2011/0299537 | A1 | 12/2011 | Saraiya et al. |
| 2012/0127999 | A1* | 5/2012 | Grosser et al. ................ 370/392 |

OTHER PUBLICATIONS

Hu, et al., "Garden: Generic Addressing and Routing for Data Center Networks," 2012 IEEE Fifth International Conference on Cloud Computing, Jun. 24-29, 2012, pp. 107-114.
Pepelnjak, Ivan., "IP Renumbering in Disaster Avoidance Data Center Designs," Jan. 20, 2012, Retrieved from http://blog.ioshints.info/2012/01/ip-renumbering-in-disaster-avoidance.html, 7 pages.

* cited by examiner

*Primary Examiner* — Willie J Daniel, Jr.
(74) *Attorney, Agent, or Firm* — Brooks, Cameron & Huebsch, PLLC (57) ABSTRACT

An example of network routing comprising a host route injection that can include injecting a host route and a next hop of the host route into a routing table. The host route can be injected into a top of rack network device and transferred to an Aggregation network device routing table. The routing entry can be updated by sharing routing updates from the compute host through the top of rack network device.

20 Claims, 6 Drawing Sheets

NETWORK ROUTING

BACKGROUND

Computing networks can include multiple network devices including routers, switches, and hubs, computing devices such as servers, desktop PCs, laptops, workstations, and peripheral devices, e.g., printers, facsimile devices, and scanners, networked together across wired and/or wireless local and or wide area networks (LANs/WANs).

Devices that route to directly connected networks use Address Resolution Protocols (ARPs) to allow devices to acquire the physical address (e.g., Media Access Control (MAC) Address) of a network device when only the IP address is known. Network devices can cache ARP entries in an ARP table (e.g., an associated correlation between an IP Address and a MAC Address) to save the ARP information. ARP entries are saved to avoid repeated attempts to acquire the same ARP information each time an ARP entry is needed for routing. An ARP cache can have a particular size limiting how many ARP entries may be stored.

DETAILED DESCRIPTION

Scaling compute host environments that have thousands of Virtual Machines (VMs) is quickly becoming a real business issue. If VMs are allocated two IP addresses each and there are 100,000 VMs in a sub-network, then the routing gateway will be required to maintain 200,000 ARP entries. For example, a VM can be allocated two IP addresses including 10.254.1.130132 and 10.254.1.230/32 (e.g., see VM connected to compute host 306-1 in FIG. 3A). In addition, there is a 1:1 correlation to correspond an IP Address with a MAC Address. If a VM has two IP addresses allocated, then there may need to be data for two corresponding IP-to-MAC Address mappings. If a large number of ARP entries exceeds the ARP entry limitation of a router, then either the router may have to be replaced by a more expensive one or the sub-network may have to be reduced in size.

Another issue that can inhibit scaling a large cloud services environment is IP allocation. A conventional network is implemented by assigning a sub-network to a router interface that is sized for the number of physical hosts or VMs. The sub-network is exhausted when all of the host IP addresses in the subnet range are assigned, and another subnet may have to be allocated to permit expansion. Issues arise when services are migrated to other network regions and want to keep the same IP addressing. An example approach is to use more specific static host routes. However, there can be issues when static routing has failures. Manual intervention may be used to rectify routing issues which can delay network recovery. In addition, the natural occurrence of "adds, moves, and changes" (AMCs) can lead to inefficient and fragmented network routing configurations.

One way to approach these issues is to attempt to facilitate IP mobility by extending the sub-network (e.g., a VLAN) to all parts of a data center. This can involve a contiguous L2 (Layer 2) fabric. However, this may extend the L2 fault domain. As such, an L2 issue or bridge loop can potentially impact the entire data center. Another approach extends a sub-network but does so across L3 (Layer 3) boundaries to avoid a contiguous L2 fabric (fault domain). As used herein, L3 and L2 refers to layers in an Open Systems Interconnection (OSI) protocol stack. Such an approach can be referred to as Overlay Transport Virtualization (OTV). OTV can provide an overlay that can enable L2 connectivity between separate L2 domains while keeping these domains independent and preserving the fault-isolation, resiliency, and load-balancing benefits of an IP-based interconnection. However, these example approaches do not address ARP cache limitations and can incur additional overhead due to the L3 involvement in the process. That is, the example approaches still rely on large ARP caches. In addition, since the VM is not physically on the network, the router relies on the hypervisor to proxy an ARP response so the gateway can learn VM Ethernet MAC addresses (e.g., Proxy ARP entries).

Embodiments of the present disclosure may include network devices, systems, including executable instructions and/or logic thereon, and methods for network routing. A network device includes a processing resource and/or logic coupled to a memory. The memory includes program instructions executed by the processing resource to inject a host route and a next hop into the router, cache only the ARP information of the next hop of the host route in the ARP table of the router and route network traffic. An advantage of the present disclosure includes facilitating IP-mobility while avoiding ARP cache size limitations. Another advantage includes the ability to implement on an existing infrastructure without large or significant upgrades at the Aggregation (AGG) router tier.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
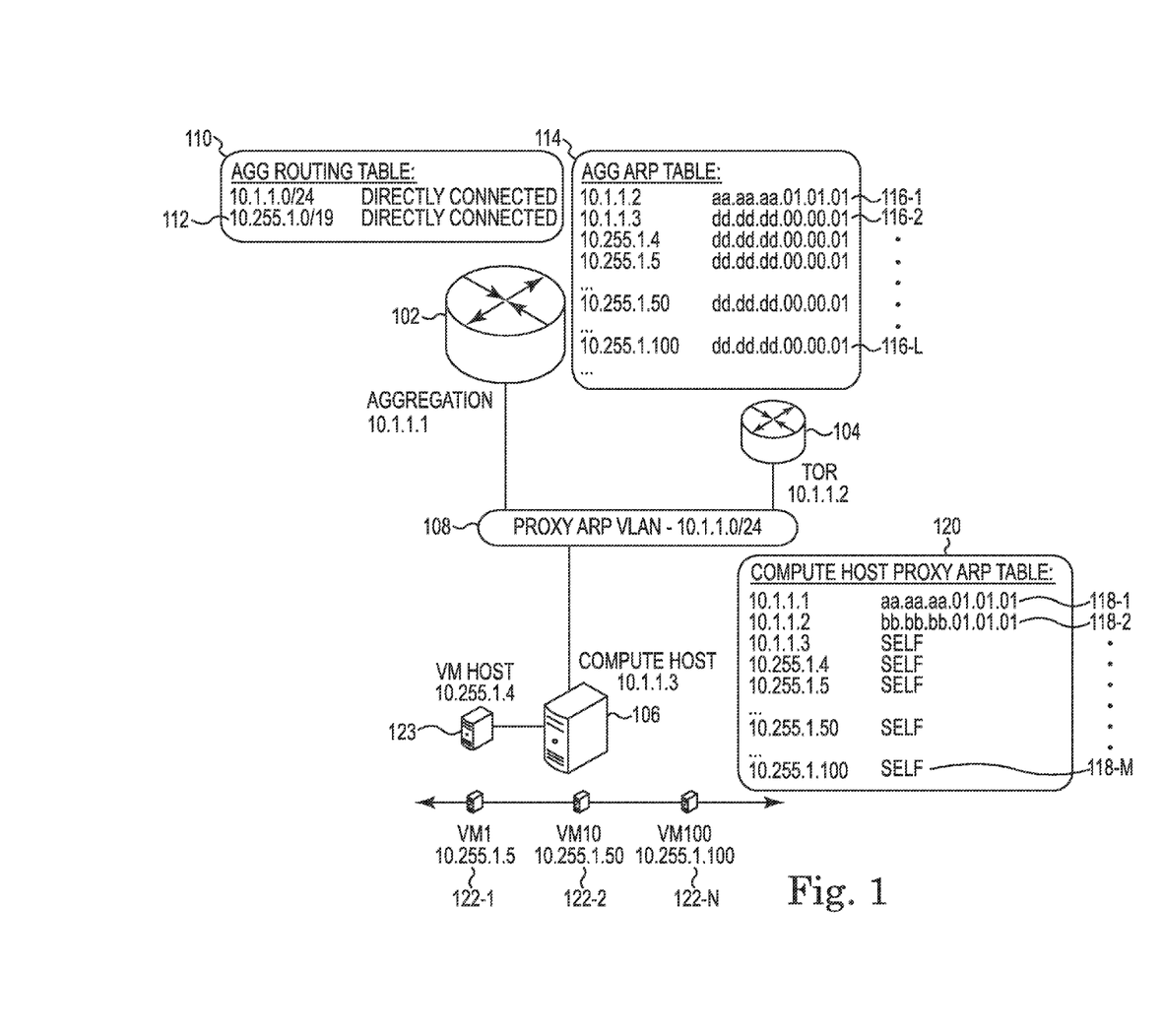
FIG. 1 illustrates an example of a previous approach to network routing.

FIG. 1 illustrates an example of a previous approach to network routing. An aggregation (AGG) router 102, a top of rack (TOR) switch/router 104, and a Compute Host 106, shown coupled together in a network 108, may be used to route network traffic. An AGG router can organize a network by replacing multiple routes with a single, general route by connecting routers (e.g., TOR 104) with multiple network access points. The AGG router 102, TOR 104, and Compute Host 106 may be networked to a proxy Address Resolution Protocol (ARP) virtual local area network (VLAN) 108.

A proxy ARP can use a technique where a device on a given network answers ARP inquiries for a network address that is not on that network. An ARP can be a telecommunications protocol for resolution of network layer (e.g., L3) addresses into link layer (e.g., L2) addresses. An ARP allows a device to acquire the physical address (e.g., a MAC Address such as 10.1.1.1 of AGG router 102 in FIG. 1) of a network device when only the IP Address (e.g., 10.255.1.0 at 112 in FIG. 2) is known. The physical address is a unique identifier to network interfaces for communication on the physical network and can be stored in the device's hardware, memory or other firmware mechanism.

In FIG. 1, the AGG router 102 may use an AGG routing table 110 to store a directly connected network. It also stores MAC addresses for Host IPs on the connected network as Address Resolution Protocol (ARP) entries 112. For example, an AGG router 102 can store directly connected 10.255.1.0/19 in an AGG routing table 112. A routing table can be a data table stored in memory of a router. A routing table 110 can list routes to particular network destinations. A routing table can include information about the topology of the network immediately around it. The AGG router 110 may use an AGG ARP table 114 to cache many, e.g., 1,000s, of the Host ARP entries 116-1, 116-2, . . . , 116-L. An AGG ARP table 114 can be where a router caches ARP entries 112 from the routing table 110. For example, an AGG router can cache network service IP addresses 10.255.1.4, 10.255.1.5, . . . 10.255.1.50, . . . 10.255.1.100 (116-1, 116-2, . . . , 116-L in FIG. 1) in the AGG ARP table 114.

As shown in FIG. 1, the AGG router 102 may be connected to a Compute Host 106 in a network via a Proxy ARP Virtual Local Area Network (VLAN), e.g., Proxy ARP VLAN 108 having IP address 10.1.1.0/24. The Compute Host 106 may host a plurality of virtual machines 122-1, 122-2, . . . , 122-N. A virtual machine can be a simulation of a machine that is different than the target machine. A virtual machine can be based on specifications of a hypothetical computer or emulate architecture and functioning of a target network device. The Compute Host 106 may communicate with a VM 123 that is one of a plurality of VMs (e.g., 122-1, 122-2, . . . , 122-N) connected to the Compute Host 106. The Compute Host 106 may cache Proxy ARP IP address entries 118-1, 118-2, . . . , 118-M in a Compute Host Proxy ARP Table 120. For example, a Compute Host can store ARP IP address entries having IP addresses 10.255.1.4, 10.255.1.5, . . . 10.255.1.50, . . . 10.255.1.100 (118-1, 118-2, . . . , 118-M in FIG. 1).

The AGG ARP Table 114 may have a specific size limit (e.g., 64K to 256K) of how many ARP entries the AGG ARP Table 114 is able to cache. If the limit is reached, either a new router with greater caching capacity may need to be added or a sub-network may need to be reduced.

Figure 2:
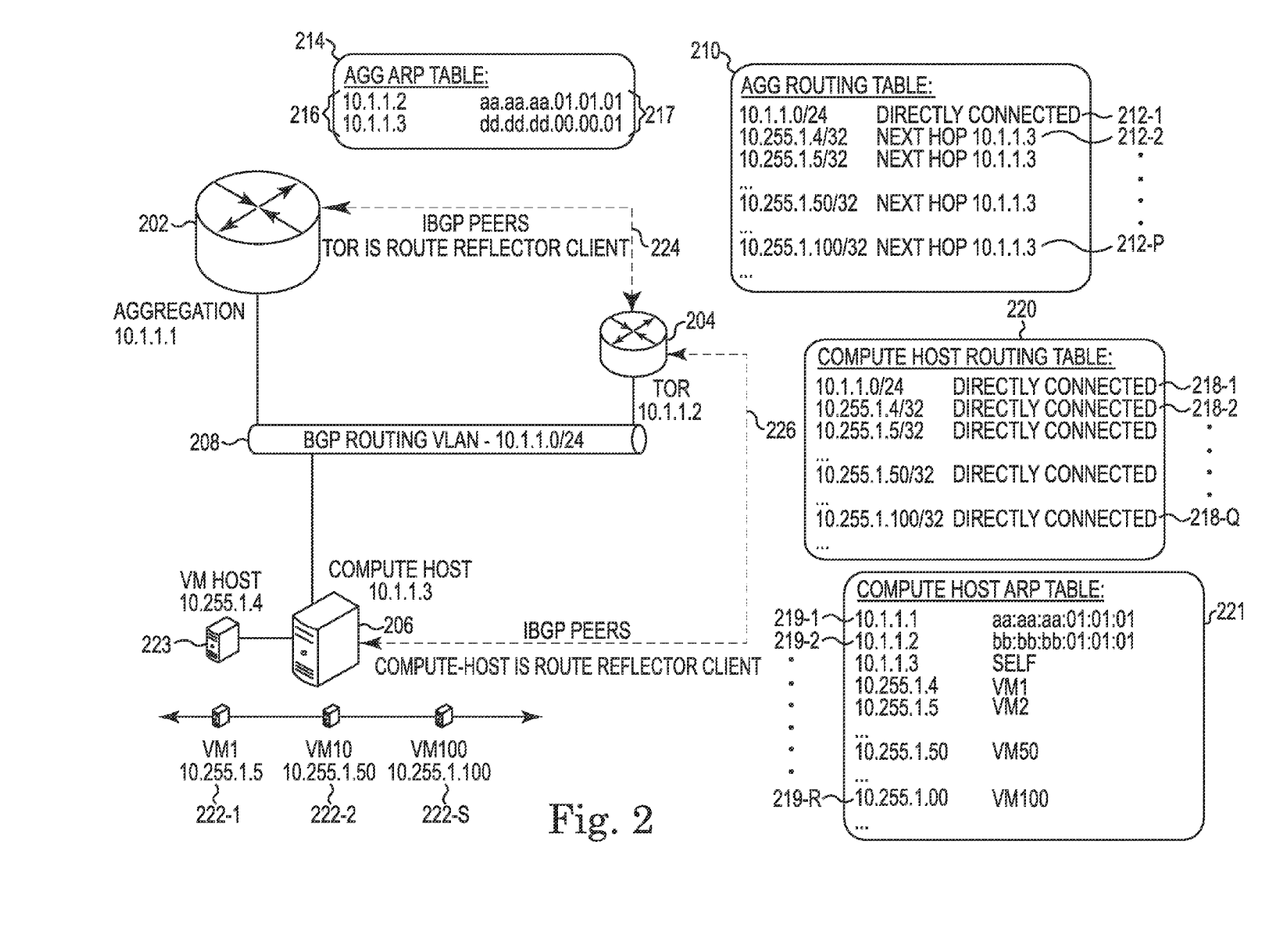
FIG. 2 illustrates an example of a system for network routing according to the present disclosure.

FIG. 2 illustrates an example of a system for network routing according to the present disclosure. An Aggregation (AGG) router 202, a top of rack (TOR) switch/router 204, and a Compute Host 206 can be used to route network traffic. A Border Gateway Protocol (BGP) virtual local area network (VLAN) 208 can be configured to be used by the AGG router 202, TOR switch 204, and Compute Host 206. BGP is a protocol that network devices use to make core routing decisions. Network devices running BGP can accommodate the use of a table of Internet Protocol (IP) networks which designate network reach-ability. For example, a BGP can accommodate hundreds of thousands of routes and potentially hundreds of peers.

An AGG router 202 can be a top-tier boundary router on an IP network. A boundary router can be a router that connects the Internet to an intranet. A boundary router can be an external firewall that connects to an internal firewall and proxy server of an intranet and/or an IP network. For example, an AGG router 202 can run routing protocols (e.g., Open Shortest Path First (OSPF), BGP, and internal Border Gateway Protocol (iBGP), to name a few). An OSPF protocol can compute the shortest path tree for a route using a shortest path first algorithm. An iBGP protocol is a protocol used between routers in a same Autonomous System (AS). For example, iBGP can be used to provide information to internal routers.

An AGG router 202 can use an AGG Routing Table 210 to store routing information such as a next hop. The corresponding MAC Addresses of the next hop IPs are stored as Address Resolution Protocol (ARP) entries 212-1, 212-2, . . . , 212-P. An AGG router 202 can use an ARP Table 214 to cache an ARP entry of the next hop router 216. For example, an AGG ARP Table 214 can cache the associated MAC address 217 for a given next hop 10.1.1.3 (216) IP Address (e.g., 212-2, . . . , 212-P from routing table 210). According to at least one embodiment, an AGG ARP Table 214 of an AGG router 202 can be used to cache only the ARP entry of the next hop router 216 to lessen a number of entries in the ARP table 214. For example, an ARP Table can cache only the next hop of a host route (e.g., 10.1.1.3 of 216 in FIG. 2) in the ARP table 214. An AGG router 202 can receive a host route from the TOR 204 which also advertises the next hop IP address for a compute host up to the AGG router 202. Using the "next hop" IP address, network traffic can be forwarded directly from the AGG router 202 to the Compute Host 206. For example, instructions can be executed or logic used to allow a compute host to inject a host route into a TOR. The TOR can send a next hop entry associated with the host route to an AGG router. The AGG router can then forward traffic directly to the compute host using the injected host route information.

In at least one embodiment, the TOR 204 can run iBGP and the TOR 204 can peer with the AGG router as a route reflector client as shown at 224. As a route reflector client, the TOR 204 can be a focal point for iBGP sessions and allow multiple BGP routers to peer at this focal point. This allows some routers to avoid peering with every router in the system. For example, a compute host can reflect any known host routes to a TOR. The TOR can reflect the host routes it receives from a compute host to an AGG router. In this manner, the TOR 204 can advertise host routes learned from the Compute Host 206 up to the 0AGG router 202.

In at least one embodiment, the Compute Host 206 can run iBGP. The Compute Host 206 can peer with a TOR switch 204 as a route reflector client. As a route reflector client, the Compute Host 206 can advertise host routes to the TOR 204 by injecting the allocated IP addresses as a host route into a TOR 204 as shown at 226. The Compute Host 206 can allocate IP addresses from a shared pool of virtual machines (VMs) 222-1, 222-2, . . . , 222-S The Compute Host 206 may communicate with a VM 223 that is one of a plurality of VMs (e.g., 222-1, 222-2, . . . , 222-S) connected to the Compute Host 206. The Compute Host can use both a Compute Host Routing Table 220 and an ARP Table 221 to map VM IP host entries (e.g., 10.255.1.4) of VM 223 to MAC Addresses (e.g., VM1 in 221). For example, a compute host can store ARP entries including 10.1.1.0/24, 10.255.1.4, 10.255.1.5, . . . , 10.255.1.50, . . . and 10.255.1.100 (218-1, 218-2, . . . , 218-Q in FIG. 2) in Compute Host Routing table 220 and corresponding 1:1 IP Addresses to MAC Addresses (e.g., 10.1.1.1 to aa:aa:aa:01:01:01 in 219-1) 219-1, 219-2, . . . , 219-R in Compute Host ARP table 221.

Figure 3A:
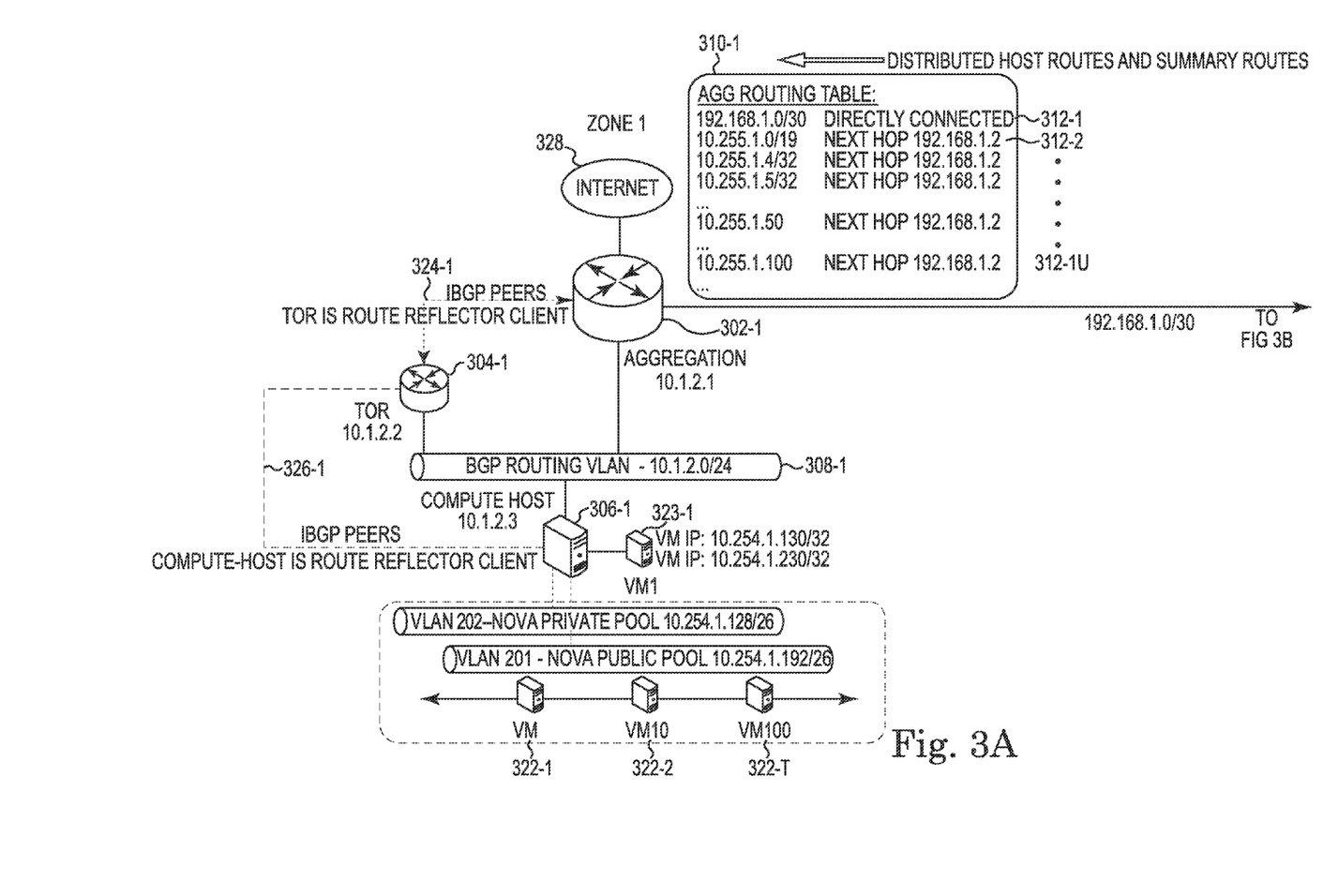
FIGS. 3A-3B illustrate an example of a system for network routing according to the present disclosure.
Figure 3B:
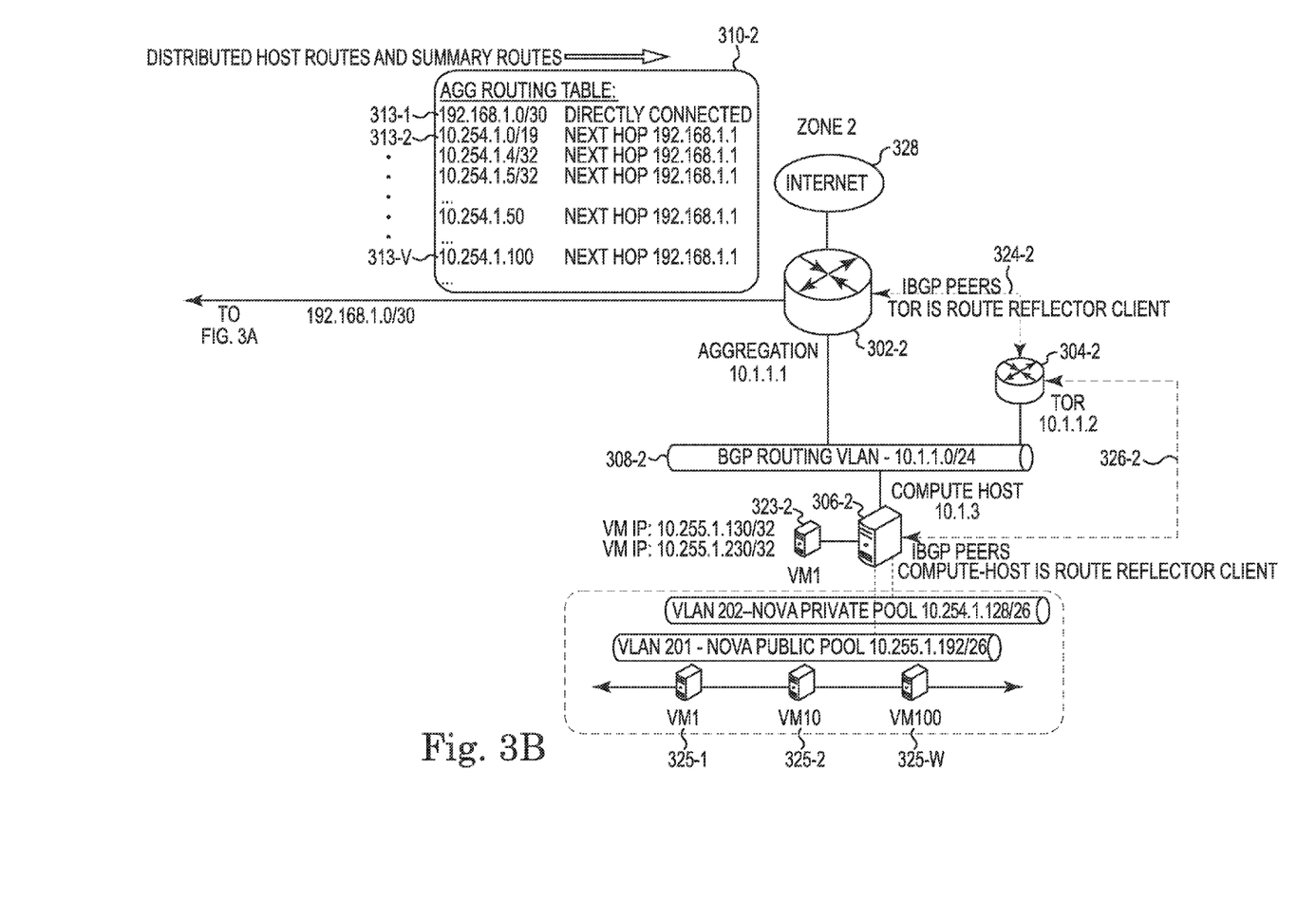

FIGS. 3A-3B illustrate an example of a system for network routing according to the present disclosure. As described in FIG. 2, FIG. 3A illustrates an Aggregation (AGG) router 302-1 (202 in FIG. 2), a top of rack (TOR) switch/router 304-1 (204 in FIG. 2), and a Compute Host 306-1 (206 in FIG. 2) that can be used to route network traffic in one zone, e.g., a first zone (Zone 1 in FIG. 3A) and/or subnet. A Border Gateway Protocol (BGP) virtual local area network (VLAN) 308-1 can be configured on the AGG router 302-1, TOR 304-1, and Compute Host 306-1. In at least one embodiment, the TOR 304-1 can use iBGP to peer, as shown at 324-1, with the AGG router 302-1 as a route reflector client. The Compute Host 306-1 can use iBGP to peer, as shown at 326-1, with a TOR switch 304-1 as a route reflector client. The Compute Host 306-1 can allocate IP addresses from a shared pool of virtual machines (VMs) 322-1, 322-2, . . . , 322-T. The Compute Host 306-1 may communicate with a VM 323-1 that is one of a plurality of VMs (e.g., 322-1, 322-2, . . . , 322-T) connected to the Compute Host 306-1.

In addition, as illustrated in FIG. 3B, there can be a similar setup for another zone and/or subnet, e.g., a second zone (Zone 2 in FIG. 3B), in communication with Zone 1 in FIG. 3A. Another Aggregation (AGG) router 302-2, a top of rack (TOR) switch/router 304-2, and a Compute Host 306-2 can be used to route network traffic in a Zone 2. A Border Gateway Protocol (BGP) virtual local area network (VLAN) 308-2 can be configured on the AGG router 302-2, TOR 304-2, and Compute Host 306-2. The TOR 304-2 can use iBGP to peer, as shown at 324-2, with the AGG router 302-2 as a route reflector client. The Compute Host 306-2 can use iBGP to peer 326-2 with a TOR switch 304-2 as a route reflector client. The Compute Host 306-2 can allocate IP addresses from a shared pool of virtual machines (VMs) 325-1, 325-2, . . . , 325-W (e.g., virtual machines from a public or private virtual machine pool). The Compute Host 306-2 may communicate with a VM 323-2 that is one of a plurality of VMs (e.g., 325-1, 325-2, . . . , 325-W) connected to the Compute Host 306-1.

An AGG router 302-1 can be connected to Internet 328 Zone 1. AGG router 302-2 can be connected to internet 328 Zone 2. The AGG router 302-1 can peer with an AGG router 302-2. The peering of AGG router 302-1 and AGG router 302-2 can permit a sharing of host routes. For example, a Compute Host 306-1 can inject a host route into TOR 304-1 through iBGP peering 326-1. The TOR 304-1 can share the host route with AGG router 302-1 through iBGP peering 324-1. The AGG router 302-1 can store the host route in the AGG Routing Table 310-1. An AGG router 302-1 can use an AGG Routing Table 310-1 to store routing information such as a next hop of a host route. The corresponding MAC Addresses of the next hop IPs are stored as Address Resolution Protocol (ARP) entries 312-1, 312-2, . . . , 312-U. The AGG router 302-1 can share the host route with AGG router 302-2 through a peer connection. An AGG router 302-2 can use an AGG Routing Table 310-2 to store routing information such as a next hop of a host route. The corresponding MAC Addresses of the next hop IPs are stored as Address Resolution Protocol (ARP) entries 313-1, 313-2, . . . , 313-V. The AGG router 302-2 can direct traffic from Zone 2 to the Compute Host 306-2 using the host route.

Internet Protocol (IP) mobility refers to the ability of a mobile device user to maintain the same IP address even though the user is moving across multiple networks, e.g., zones and/or subnets as described above. The system of FIGS. 3A-3B can allow such IP mobility to occur by connecting different zones, intranets, and/or subnets (e.g., Zone 1, Zone 2, etc.) and allowing communication between these zones.

Figure 4:
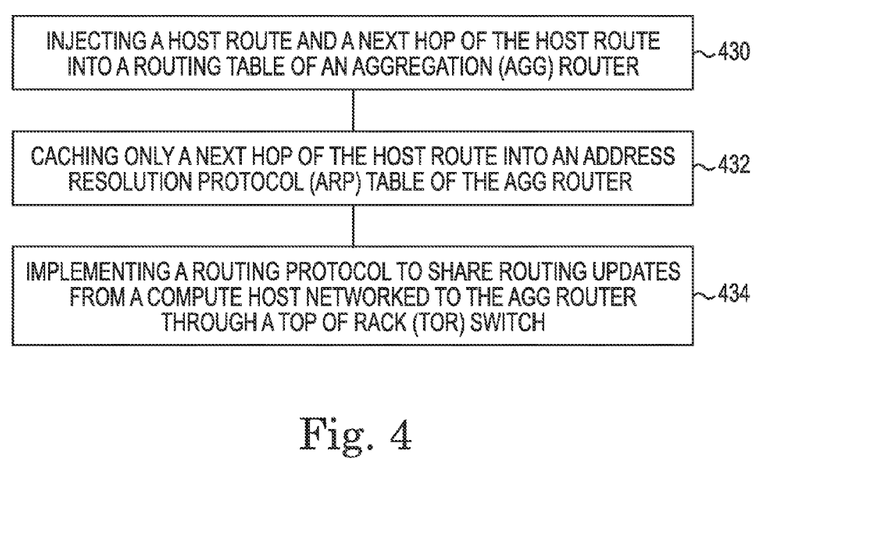
FIG. 4 illustrates an example of a method of network routing according to the present disclosure.

FIG. 4 illustrates an example of a method of host route injection according to the present disclosure. At block 430, the method comprises injecting a host route and a next hop of the host route into a routing table (e.g., 210 of FIG. 2) of an Aggregation router (e.g., 202 in FIG. 2). A Compute Host, e.g., compute host 206 of FIG. 2, can be the origin of an injected host route. The Compute Host can allocate IP addresses from a shared pool of virtual machines (VMs) (e.g., VMs 222-1, 222-2, . . . , 222-S in FIG. 2 as part of the host route). The Compute Host can inject the allocated IP addresses as a host route into the AGG routing table using a routing protocol (208 of FIG. 2). The routing protocol can include Border Gateway Protocol.

The shared pool of VMs represents VMs that can be added or deleted from the pool of VMs. For example, a VM may be added to a pool of VMs and therefore increase the amount of possible host routes. On the other hand, for example, a VM may be deleted from a pool of VMs and therefore prevent particular host routes from being used. A host route can correspond to a virtual machine that the host route uses to access network information. A host route can be injected if it corresponds to an added virtual machine. A host route can be withdrawn if it corresponds to a virtual machine that has been deleted.

At block 432, the next hop of a host route can be cached into an Address Resolution Protocol (ARP) table (e.g., 214 in FIG. 2) of the AGG router (e.g., 202 in FIG. 2). An AGG router can use an ARP table to cache an ARP entry of the next hop router. In at least one embodiment, an ARP table of an AGG router can be used to cache only the ARP entry of the next hop router. An AGG router can receive a host route from a top of rack (TOR) switch/router along with the next hop IP of a compute host. The network traffic can be forwarded directly from the AGG router to a compute host.

At block 434, a routing protocol can be implemented to share a routing update from a compute host networked to the AGG router through a TOR. An implementation of the routing protocol can comprise a three tier network topology between a compute host and an AGG router. The three tier network topology can include connecting an internal Border Gateway Protocol (iBGP) path between the compute host and a TOR and between the TOR and the AGG router. The compute host can advertise the next hop of a host route to the TOR through an iBGP. The TOR can communicate the next hop of the host route to the AGG router. The AGG router can then connect directly to the compute host using the next hop entry information it has received from the TOR.

A Border Gateway Protocol (BGP) virtual local area network (VLAN) (e.g., 208 in FIG. 2) can be configured on an AGG router, TOR, and Compute Host. A BGP can be a protocol that makes core routing decisions. A BGP can maintain a table of Internet Protocol (IP) networks which designate network reach-ability. For example, a BGP can accommodate hundreds of thousands of routes and potentially hundreds of peers.

The AGG router can run routing protocols (e.g., Open Shortest Path First (OSPF) and internal Border Gateway Protocol (iBGP)). An OSPF protocol can compute the shortest path tree for a route using a shortest path first algorithm. An iBGP protocol can be a protocol used between routers in the same Autonomous System (AS). iBGP can be used to provide information to internal routers.

The TOR (204 in FIG. 2) can run iBGP. The TOR can peer with an AGG router as a route reflector client. A route reflector client can be a focal point for iBGP sessions and allow multiple BGP routers to peer at this focal point. This allows some routers to avoid peering with every router in the system. A TOR can advertise host routes learned from a Compute Host up to the AGG router.

The Compute Host (206 in FIG. 2) can run iBGP. The Compute Host can peer with a TOR as a route reflector client. The Compute Host can be the origin of a host route. The Compute Host can allocate IP addresses from a shared pool of virtual machines (e.g., 221-1, 222-2, . . . , 222-S in FIG. 2). The Compute Host can inject the allocated IP addresses as a host route into an iBGP. The Compute Host can use a Compute Host Routing Table containing ARP entries to store network information.

Figure 5:
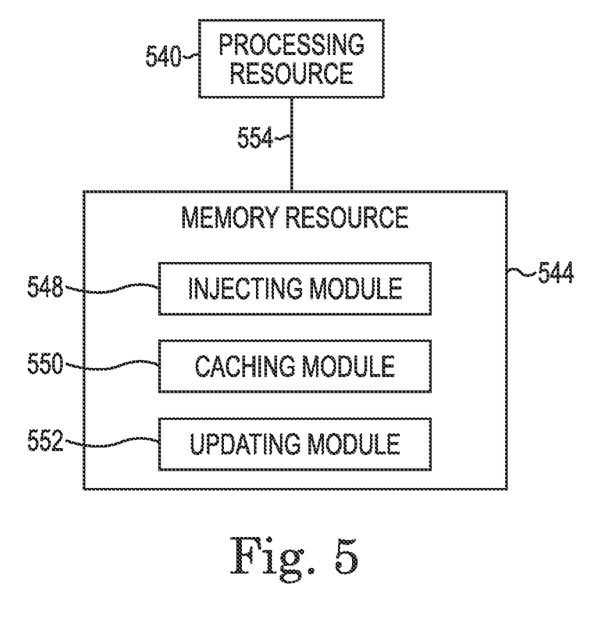
FIG. 5 illustrates a block diagram illustrating an example of a processing resource and a memory resource for network routing according to the present disclosure.

FIG. 5 illustrates a block diagram illustrating an example of a processing resource 540 and a memory resource 544 for network routing according to the present disclosure. The processing resource 540 and the memory resource 540 can be local to a computing network, such as on a router. The memory resource 544 (e.g., a tangible, non-transitory medium) can store a set of program instructions (e.g., software, firmware, etc.) executable by the processing resource 540. Memory resource 544 may be integrated in a single device or distributed across devices. The memory resource 544 may be fully or partially integrated in the same device as processing resource 540 or it may be separate but accessible to that device and processing resource 540. The memory resource 544 can be local to a router or remote therefrom. For those examples in which the memory resource 544 is remote from the router, the instructions can be loaded into the memory resource of the router.

The instructions stored in the memory resource 544 can be executed as a programmable option of the router. For example, a network administrator can enable the functionality provided by portions, or all, of the instructions according to the programmable option. Providing the same as a programmable option can be beneficial because various examples of the present disclosure may not be compliant with a number of standards for wireless transmissions (e.g., IEEE 802.11). In some examples, the functionality provided by the instructions can, by default, be disabled, and only enabled according to the programmable option, however examples are not so limited.

Memory resource 544 can be in communication with a number of processing resources of more or fewer than 540. The processing resources 540 can be in communication with a tangible non-transitory memory resource 544 storing a set of computer-readable instructions (CRI) executable by one or more of the processing resources 540, as described herein. The CRI can include a number of modules 548, 550, and 552. The CRI can also be stored in remote memory managed by a server and represent an installation package that can be downloaded, installed, and executed.

Processing resources 540 can execute CRI that can be stored on an internal or external non-transitory memory resource 544. The processing resources 540 can execute CRI to perform various functions, including the functions described in FIG. 1, FIG. 2, and FIGS. 3A-3B. For example, the processing resources 540 can execute CRI to implement network routing from FIG. 2.

The number of modules 548, 550, and 552 can include CRI that, when executed by the processing resources 540, can perform a number of functions. The number of modules 548, 550, and 552 can be sub-modules of other modules. For example, an injecting module 548 and a caching module 550 can be sub-modules and/or contained within the converting module 548 in FIG. 5. In another example, the number of modules 548, 550, and 552 can comprise individual modules on separate and distinct computing devices.

An injecting module 548 can include CRI that when executed by the processing resources 540 can perform an injection of a host route from a compute host (206 in FIG. 2) to a TOR (204 in FIG. 2). The injection of a host route can include injecting a host route and a next hop entry of the host route from a compute host (206 in FIG. 2) into a routing table (210 in FIG. 2) of an Aggregation (AGG) router (202 in FIG. 2). The injection of a host route can include allocating an injected host route from a shared pool for virtual machines to a compute host.

A caching module 550 can include CRI that when executed by the processing resource 540 can cache an Address Resolution Protocol (ARP) entry. Caching an ARP entry can include caching only an ARP entry of a next hop of the host route in an ARP table of an AGG router. For example, an ARP entry including 10.1.1.3 (216 in FIG. 2) of a next hop can be cached in an ARP table (214 in FIG. 2) of an AGG router (202 in FIG. 2).

An updating module 552 can include CRI that when executed by the processing resource 540 can perform an update by sharing routing updates from a compute host (206 in FIG. 2) through a TOR (204 in FIG. 2). The update can be through a dynamic sharing of routing updates. The updating can include using an internal Border Gateway Protocol (iBGP) to connect an AGG router, a compute host, and a TOR switch/router.

A non-transitory memory resource 544, as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, as well as other types of computer-readable media.

The non-transitory memory resource 544 can be integral, or communicatively coupled, to a computing device, in a wired and/or a wireless manner. For example, the non-transitory memory resource 544 can be an internal memory, a portable memory, a portable disk, or a memory associated with another computing resource (e.g., enabling CRIs to be transferred and/or executed across a network such as the Internet 328).

The memory resource 544 can be in communication with the processing resources 540 via a communication path 554. The communication path 554 can be local or remote to a machine (e.g., a computer) associated with the processing resources 540. Examples of a local communication path 554 can include an electronic bus internal to a machine (e.g., a computer) where the memory resource 544 is one of volatile, non-volatile, fixed, and/or removable storage medium in communication with the processing resources 540 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 554 can be such that the memory resource 544 is remote from the processing resources e.g., 540, such as in a network connection between the memory resource 544 and the processing resources (e.g., 540). That is, the communication path 554 can be a network connection. Examples of such a network connection can include a local area network (LAN), wide area network (WAN), personal area network (PAN), and the Internet, among others. In such examples, the memory resource 544 can be associated with a first computing device and the processing resources 540 can be associated with a second computing device (e.g., a Java® server). For example, a processing resource 540 can be in communication with a memory resource 544, wherein the memory resource 544 includes a set of instructions and wherein the processing resource 540 is designed to carry out the set of instructions.

The processing resources 540 coupled to the memory resources 544 can execute CRI to inject a host route into a routing table. The processing resources 540 coupled to the memory resources 544 can also execute CRI to cache an ARP entry of a next hop of a host route in an ARP table of an AGG router. The processing resources 540 coupled to the memory resources 544 can also execute CRI to update an ARP entry by sharing routing updates from a compute host through a TOR.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. The specification examples provide a description of the applications and use of the system and method of the present disclosure. Since many examples can be made without departing from the spirit and scope of the system and method of the present disclosure, this specification sets forth some of the many possible example configurations and implementations.

What is claimed:

1. A system for network routing comprising:
   an Aggregation (AGG) network device comprising:
   a routing table that stores Address Resolution Protocol (ARP) entries including corresponding next hop Internet Protocol (IP) addresses; and
   an ARP table that caches only a next hop MAC address of a host route;
   a top of rack (TOR) network device that peers with the AGG network device as a first route reflector client; and
   a compute host that peers with the TOR network device as a second route reflector client and injects the next hop MAC address of the host route into the TOR through network peering, wherein the AGG network device, the TOR network device, and the compute host share a common local area network.

2. The system of claim 1, wherein the AGG network device, the TOR network device, and the compute host are configured to use the common local area network (LAN) comprising a Border Gateway Protocol routing LAN.

3. The system of claim 1, wherein the AGG network device is an AGG router that runs routing protocols comprising:
   Open Shortest Path First; and
   internal Border Gateway Protocol (iBGP).

4. The system of claim 1, wherein the TOR network device is a switch that runs iBGP and the compute host runs iBGP.

5. The system of claim 1, wherein the compute host connects to a plurality of virtual machines.

6. The system of claim 1, wherein the next hop MAC address forwards network traffic directly from the AGG network device to the compute host.

7. The system of claim 6, wherein the compute host injects the host route into the TOR network device.

8. The system of claim 7, wherein the host route injected into the TOR network device is sent to the AGG network device.

9. A method for network routing comprising:
   injecting a host route and a next hop IP address of the host route, by a compute host, into a routing table of an Aggregation (AGG) router;
   caching only a corresponding next hop MAC address of the host route into an Address Resolution Protocol (ARP) table of the AGG router; and
   implementing a routing protocol to share routing updates from a compute host networked to the AGG router through a top of rack (TOR) switch.

10. The method of claim 9, wherein implementing the router protocol comprises implementing a three tier network topology between the compute host and the AGG router, the three tier network topology connecting an internal Border Gateway Protocol path between the compute host and the TOR switch and between the TOR switch and the AGG router.

11. The method of claim 9, wherein implementing the routing protocol comprises using the compute host as a reflector client to the TOR switch and using the TOR switch as a reflector client to the AGG router.

12. The method of claim 9, wherein the TOR switch receives a default route from the AGG router and the host route from the compute host.

13. The method of claim 9, wherein the compute host injects a host route as a virtual machine corresponding to the host route is added or withdraws a host route as a virtual machine corresponding to the host route is deleted.

14. A non-transitory computer-readable medium storing program instructions executable by a processing resource to:
   inject a host route and a next hop IP address of the host route, by a compute host, from the compute host into a routing table of an Aggregation (AGG) router;
   cache only an ARP entry of the next hop of the host route including a next hop MAC address in an Address Resolution Protocol (ARP) table of the AGG router; and
   update the ARP entry by dynamically sharing routing updates from the compute host through a TOR switch.

15. The medium of claim 14, wherein the program instructions executed to inject a host route comprises:
   allocating the injected host route from a shared pool for virtual machines to a compute host; and
   injecting the host route from the compute host into a routing protocol.

16. The medium of claim 15, wherein the program instructions are executed to forward network traffic directly from the AGG router to the compute host.

17. The medium of claim 15, wherein the program instructions executed to store ARP information includes updating the ARP entry by using an internal Border Gateway Protocol that connects the AGG router, the compute host, and the TOR switch.

18. The medium of claim 14, wherein the program instructions are executed to advertise a network summary route via a routing protocol to minimize a size of the routing table.

19. The medium of claim 14, wherein the AGG router, the TOR switch, and the compute host are included in a first zone subnet and an additional AGG router, an additional TOR switch, and an additional compute host are included in a second zone subnet in communication with the first zone subnet.

20. The medium of claim 19, wherein the program instructions are executable by a processing resource to share the next hop IP address and corresponding next hop MAC address of the AGG router of the first zone subnet with the additional AGG router of the second zone subnet through a peer connection.

* * * * *